United States Patent [19]
Lee

[11] Patent Number: 5,299,365
[45] Date of Patent: Apr. 5, 1994

[54] ELECTRIC DRYER CIRCUIT SYSTEM

[76] Inventor: Yun H. Lee, No. 42, Chiao Ai 6th Rd., Hsin Tien City, Taipei Hsien, Taiwan

[21] Appl. No.: 997,813

[22] Filed: Dec. 29, 1992

[51] Int. Cl.⁵ .............................................. F26B 19/00
[52] U.S. Cl. ........................................ 34/48; 34/55; 34/53
[58] Field of Search ................ 34/55, 54, 48, 44, 53, 34/133 L, 133 J

[56] References Cited

U.S. PATENT DOCUMENTS

| | | | |
|---|---|---|---|
| 4,195,415 | 4/1980 | Livings et al. | 34/55 |
| 4,206,552 | 6/1980 | Pomerantz et al. | 34/55 |
| 4,286,391 | 9/1981 | Gerry | 34/55 |
| 4,327,502 | 5/1982 | Matsuo et al. | 34/55 |

*Primary Examiner*—Henry A. Bennet
*Assistant Examiner*—Denise Gromada
*Attorney, Agent, or Firm*—Lowe, Price, LeBlanc & Becker

[57] ABSTRACT

An electric dryer circuit system is disclosed consisted of a 110 V/220 V power voltage selection switch, a low-/high/off power switch, a load circuit, an automatic circuit breaker, a DC power converter, a timer and display system, a driver system, an automatic conducting device, whereby the driver system drives the automatic conducting device to turn on the load circuit according to the predetermined setting made through the timer and display system; said automatic circuit breaker automatically cuts off power supply from the load circuit as the automatic conducting circuit does not work.

1 Claim, 5 Drawing Sheets

ELECTRIC DRYER CIRCUIT SYSTEM

BACKGROUND OF THE INVENTION

The present invention relates to an electric dryer circuit system for an electric dryer, and more particularly the present invention relates to an automatic circuit breaker which automatically cuts off power supply as the load does no work.

Various electric dryers have been proposed for drying things, and have appeared on the market. The electric circuit system of an ordinary electric dryer, as shown in FIGS. 4 and 5, is generally comprised of a 110 V/220 V voltage selection switch for 110 V/220 V voltage selection control, a power switch for low-power/high-power/off controls, a DC power converter for converting AC power supply into the desired DC working voltage, a timer and display system for automatic timing control, a driver system controlled by the timer and display system to drive a load via an automatic conducting device. This structure of electric dryer circuit system can not prevent overcurrent and overheat, and the load may be burnt out easily in case of an overheat.

SUMMARY OF THE INVENTION

The present invention eliminates the aforesaid problems. It is therefore the main object of the present invention to provide an electric dyer circuit which minimizes power consumption, and which automatically cuts off power supply as the load does no work. The present invention is to connect an automatic circuit breaker between the 110 V/220 V voltage selection switch and the DC power converter, which receives a signal from the automatic conducting device as the automatic conducting device does no work, and automatically cuts off power supply upon receipt of such a signal.

DETAILED DESCRIPTION OF THE PREFERRED EMBODIMENT

Figure 1:
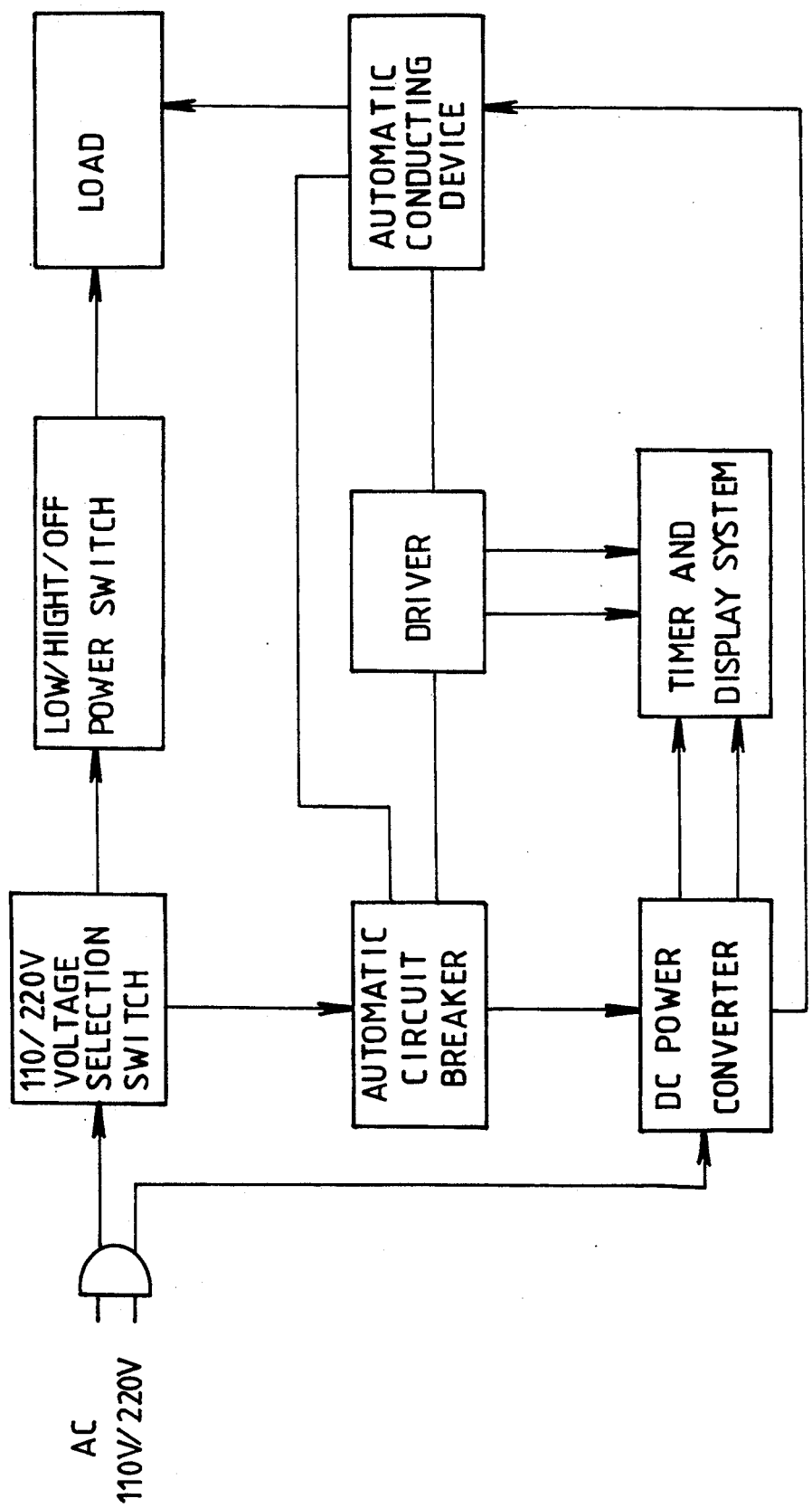
FIG. 1 is a block diagram of an electric dryer circuit system according to the present invention.
Figure 2:
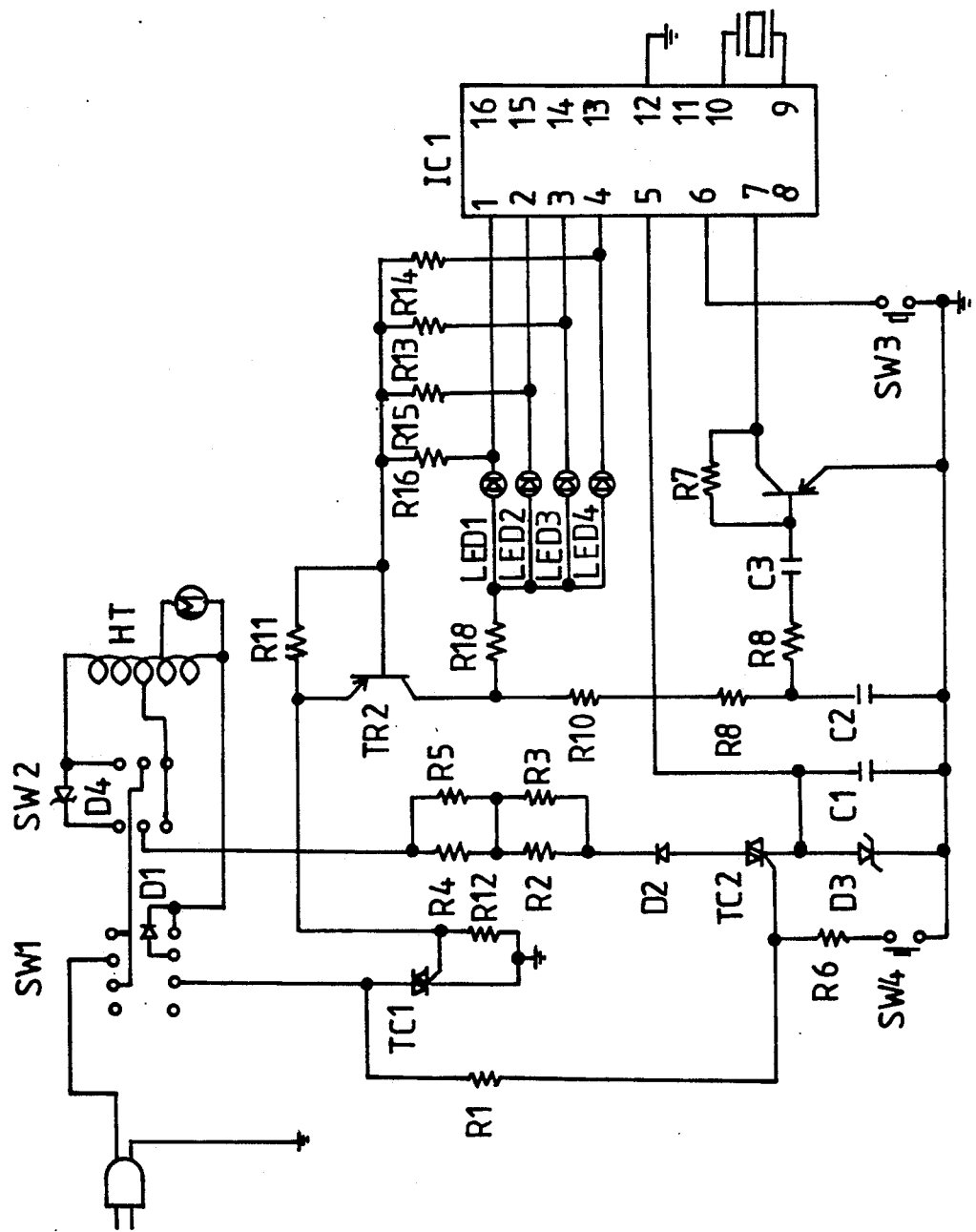
FIG. 2 is a circuit diagram of the electric dryer circuit system of FIG. 1.
Figure 3:
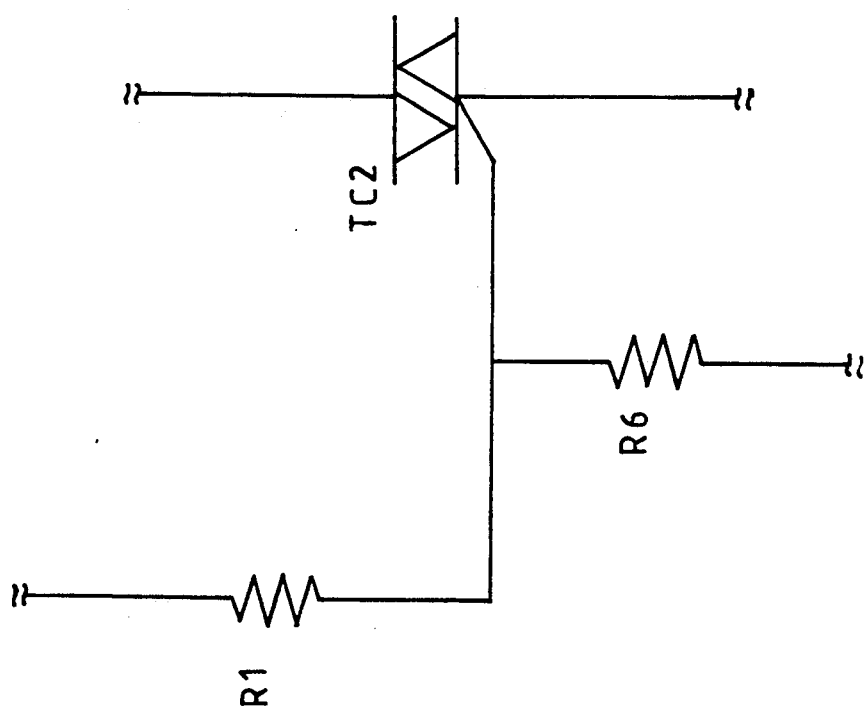
FIG. 3 is a circuit diagram of the automatic circuit breaker of the electric dryer circuit system of FIG. 1.
Figure 4:
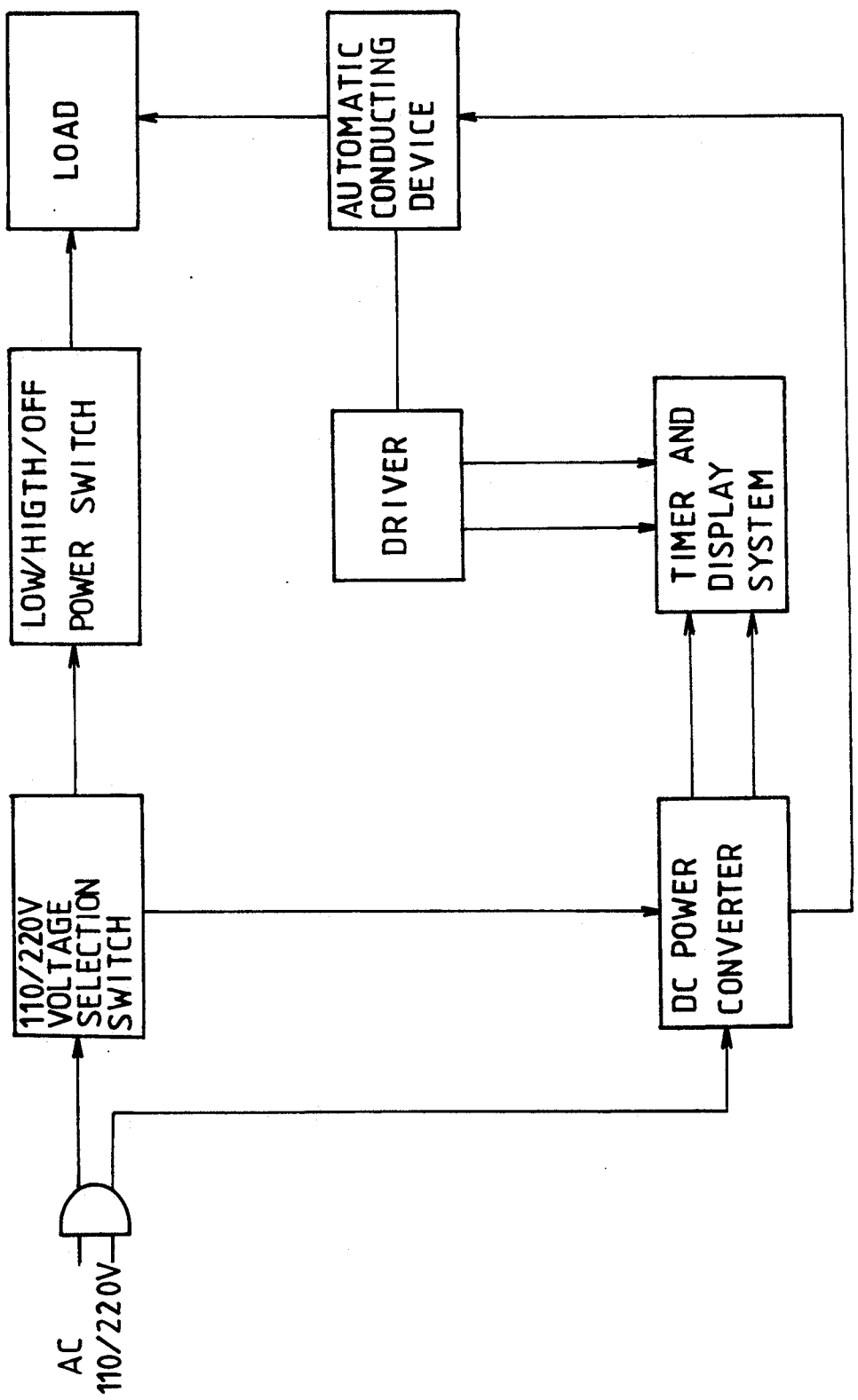
FIG. 4 is a block diagram of an electric dryer circuit system according to the prior art.
Figure 5:
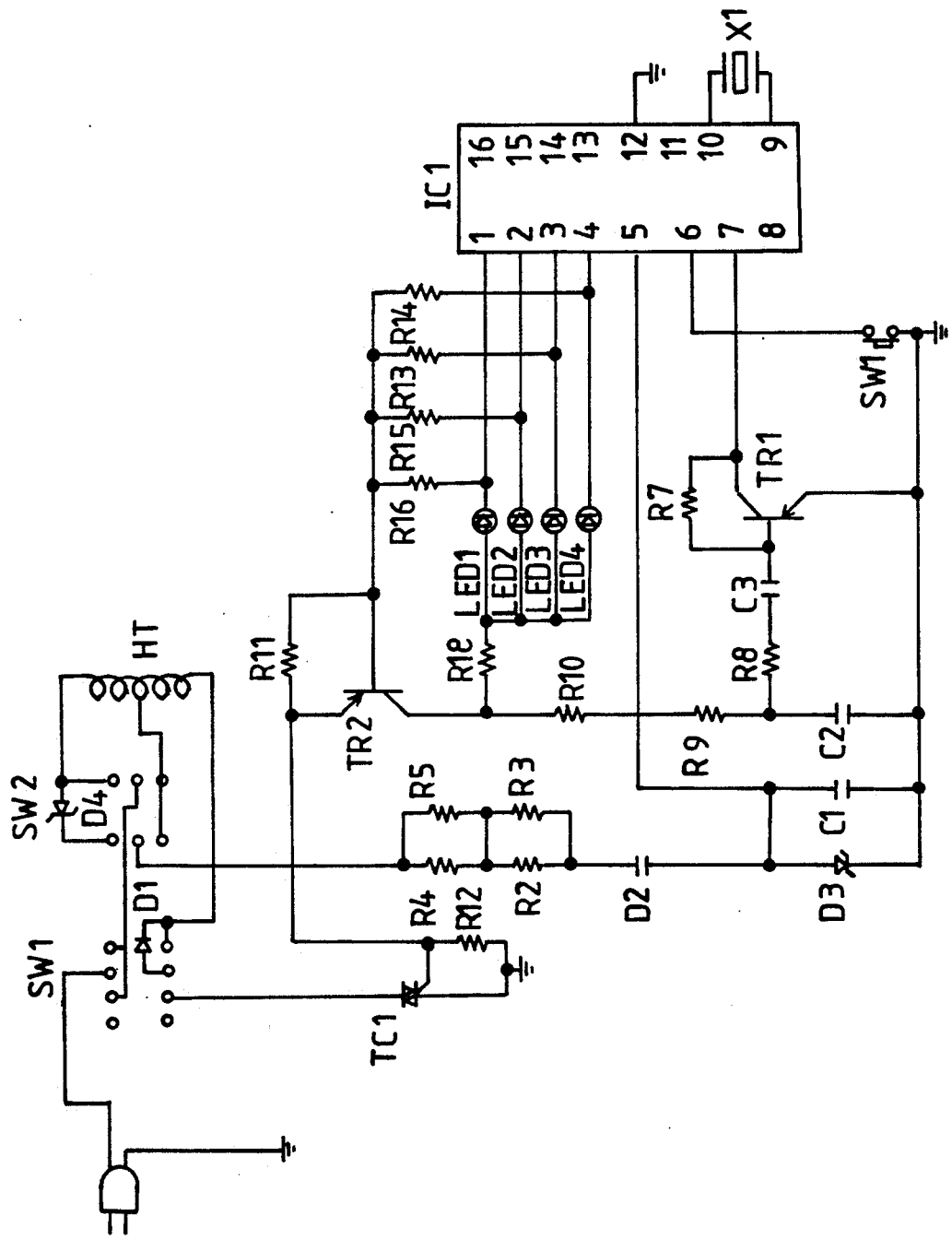
FIG. 5 is a circuit diagram of the electric dryer circuit system of FIG. 4.

Referring to FIGS. 1, 2, and 3, an electric dryer circuit system in accordance with the present invention is generally comprised of a power voltage selection switch, a low/high/off power switch, an electric heating coil-motor-fan system, an automatic circuit breaker, a driver system, an automatic conducting device, a DC power converter, and a timer and display system.

The power voltage selection switch SW2, as illustrated in FIG. 2, is connected with a zener diode D4 for 110 V/220 V power voltage selection control.

The low/high/off power switch is connected between the power voltage selection switch and the electric heating coil-motor-fan system for controlling the operation of the electric heating coil-motor-fan system at low-power or high-power or cutting off its power supply.

The automatic circuit breaker, as shown in FIG. 3, is consisted of R1,R2 and TC2. The element TC2 is a three-end switch comprised of a two-way switch and a control device at the third end. This circuit breaker prevents overheat of the current limiting and voltage dropping resistors.

The DC power converter is a rectifier circuit consisted of R2,R3,R4,R5, D2,D3 and C1, which converts AC110 v/220 V into the desired DC voltage for the electric circuit system.

The timer and display system is comprised of timer switches SW3,SW4 synchronously operated for time setting controls, and a display system consisted of R14,R15,R16,R18,IC1, LED1, LED2, LED3 and LED4, wherein LED1 is for the indication of automatically stopping at an half hour; LED2 is for the indication of automatically stopping at one hour; LED3 is for the indication of automatically stopping at 2 hours; LED4 is for the indication of automatically stopping at four hours. When either LED is turned on, a corresponding signal is sent to the driver system in causing it to turn on the automatic conducting device.

The driver system is consisted of R10,R11,TR2 and controlled by the timer and display system to trigger the automatic conducting device in turning on the electric heating coil-motor-fan system.

The automatic conducting device is consisted of TC1,R12 controlled by the driver system to connect the DC voltage of the DC power converter to the electric heating coil-motor-fan system.

The electric heating coil-motor-fan system is the load (consisted of HT) controlled by the automatic conducting device.

Power supply is transmitted through the power voltage selection switch to the electric heating coil-motor-fan system via the low/high/off power switch. At the same time, electric current is sent from the power voltage selection switch through the automatic circuit breaker to the DC power converter. When rectified, DC power supply from the DC power converter is sent to the automatic conducting device, and the driver system via the timer and display system. By means of the setting of the timer and display system, the driver system is controlled to turn on the automatic conducting device, thereby causing the operation of the electric heating coil-motor-fan system. As the automatic conducting device is turned off by the driver system, a corresponding signal is sent to the automatic circuit breaker, thereby causing it to cut off the circuit.

What is claimed is:

1. In an electric dryer circuit system including a power voltage selection switch, a low/high/off power switch, a DC power converter, a timer and display system, a driver means system, an automatic conducting device, and a dryer load consisted of an electric heating coil, a motor and a fan said driver system means being coupled between said timer and display system and said automatic conducting device and dryer load for driving said dryer load through said automatic conducting device; said DC power converter including a rectifier diode and said power voltage selector switch including a zener diode and said driver system means is controlled by said timer and display system the improvement comprising: automatic breaker circuit means controlled by said automatic conducting circuit and coupled between said rectifier diode and zener diode for cutting off the power supply therebetween responsive to a signal from said automatic conducting circuit indicating no work from the dryer load.

* * * * *